Oct. 17, 1950      H. MARGILOFF      2,525,924
BABY CARRIAGE

Filed March 18, 1946      4 Sheets-Sheet 1

INVENTOR.
Henry Margiloff
BY
ATTORNEYS.

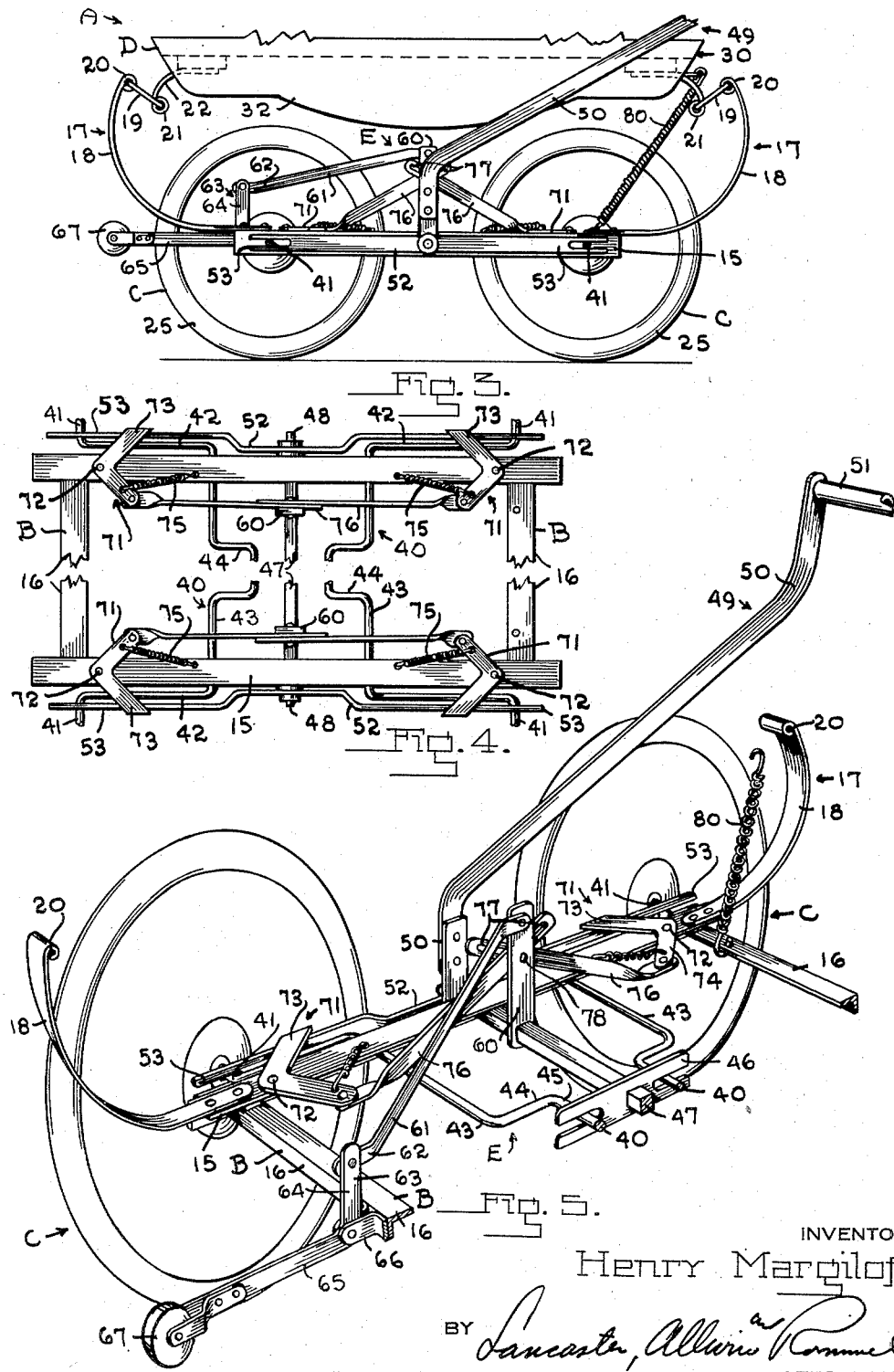

Oct. 17, 1950 H. MARGILOFF 2,525,924
BABY CARRIAGE
Filed March 18, 1946 4 Sheets-Sheet 3
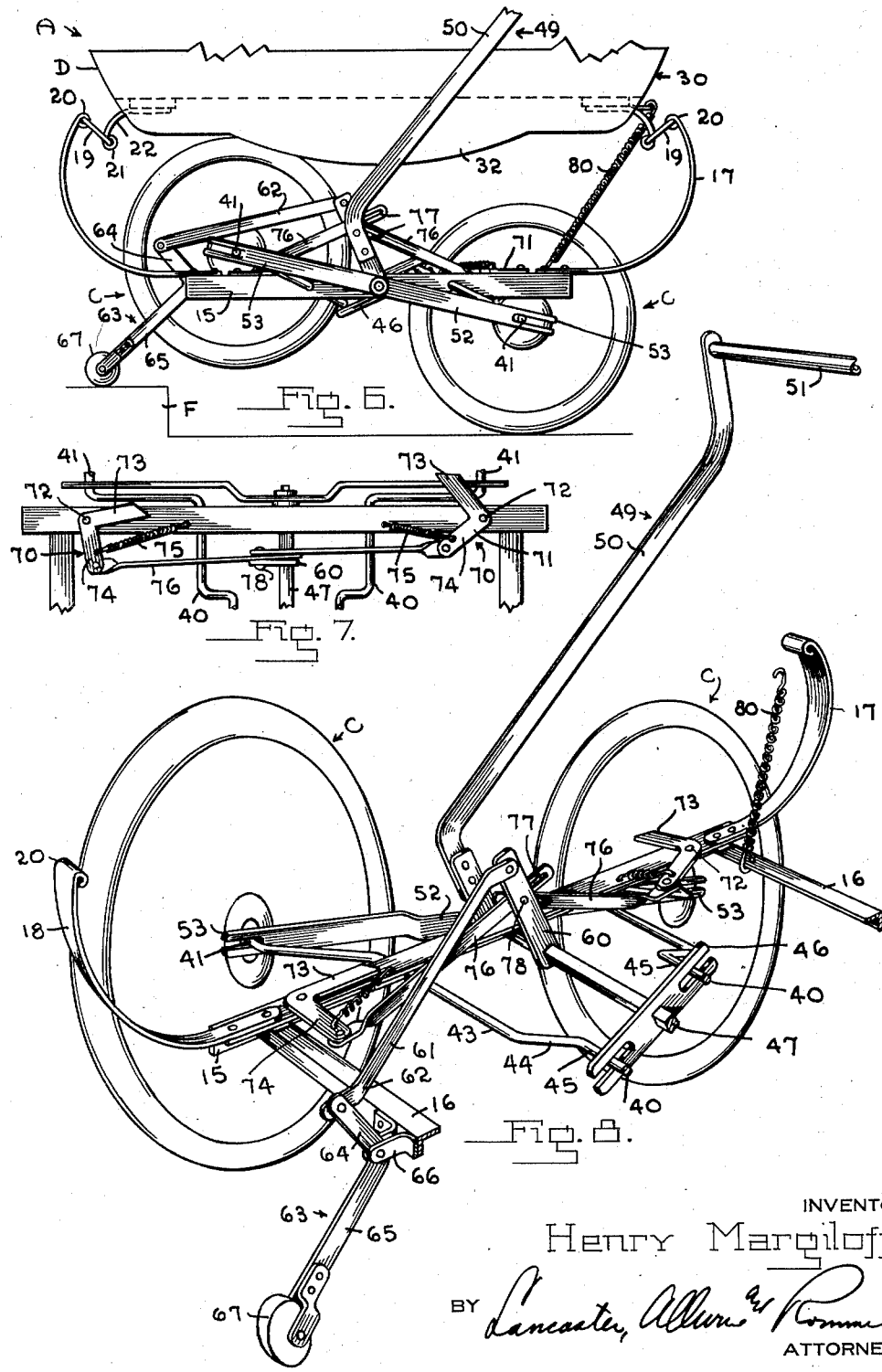
INVENTOR.
Henry Margiloff
BY Lancaster, Allwine & Rommel
ATTORNEYS.

Oct. 17, 1950   H. MARGILOFF   2,525,924
BABY CARRIAGE
Filed March 18, 1946   4 Sheets-Sheet 4
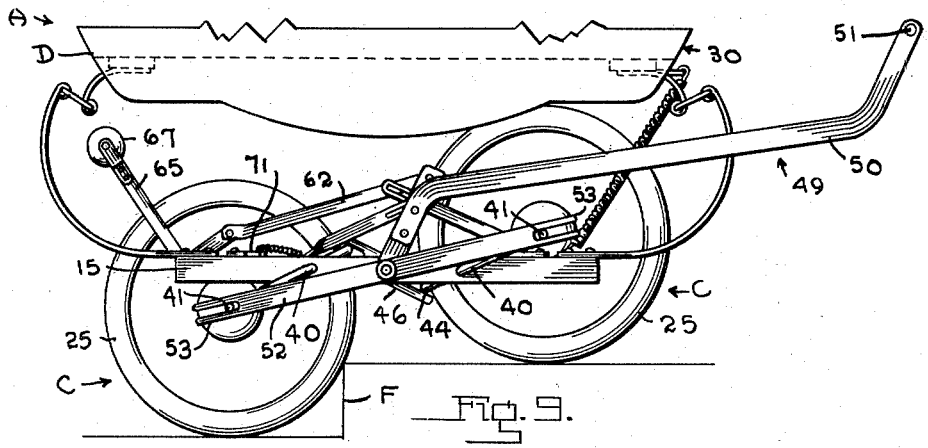
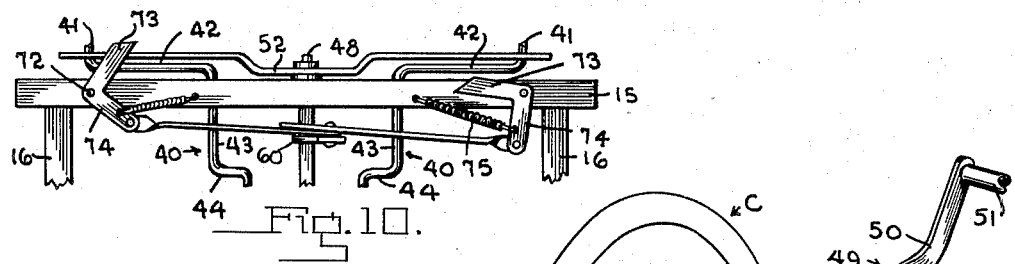
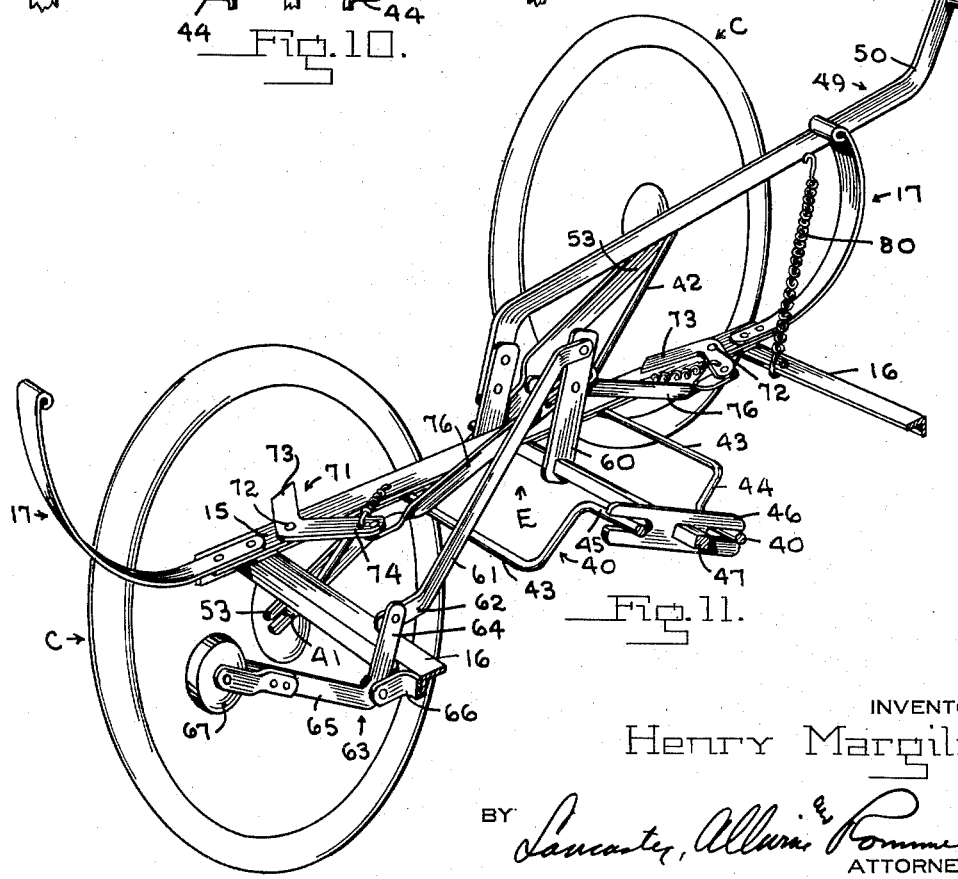
INVENTOR.
Henry Margiloff
BY Lancaster, Allwine & Rommel
ATTORNEYS.

Patented Oct. 17, 1950

2,525,924

UNITED STATES PATENT OFFICE 2,525,924

BABY CARRIAGE

Henry Margiloff, Chicago, Ill.

Application March 18, 1946, Serial No. 655,211

13 Claims. (Cl. 280—29)

1

This invention relates to hand-steered land vehicles, of which an example is a baby carriage, and more particularly to vehicles provided with means to enable them to be readily steered over curbs and the like without canting the bodies of the vehicles to any undesirable extent.

An important object of the invention is to provide a vehicle, including a chassis, wheels and body, equipped with means to enable the operator to steer the vehicle along a substantially level surface, as a sidewalk, in the ordinary way, but, as the operator reaches a curb, he may cause the vehicle to descend the curb without tipping the body to any undesirable extent and may also cause it to ascend a curb without tipping the body. This is particularly important in the case of vehicles such as baby carriages, where it is desirable, for the comfort of the occupants, to maintain the vehicles' bodies in substantially level positions at all times, and also desirable, for the safety of the occupants, to maintain the vehicles' bodies substantially level while ascending or descending curbs, since sudden or sharp inclinations of the bodies are apt to throw the occupants from the vehicles or, in the case of descending, tip over the vehicles.

Another important object is to provide for an easy, smooth descent and ascent of curbs and the like, all by simple manipulations of the steering handle portions of the novel vehicle.

Yet another important object is to provide a vehicle as described which, whether the center of gravity be to one end or the other of the center of the body of the vehicle, will not be inclined to tip or vibrate.

Another important object is to provide a steering means comprising few, simple and easily operable parts. Not only is this important in the matter of repairs and replacements of parts but the simple operations of steering are quickly understood and, in fact, very quickly mastered, so that steering, including the ascent and descent of curbs, is done instinctively.

A major object is to provide means to readily lock those portions of the mechanism employed in the ascent and descent of curbs, against operation during steering movements which might be apt to throw these portions into operation, as when the vehicle is ascending or descending stairs on two of its wheels or when it is being turned about on two wheels.

Other objects and advantages of the invention will be apparent during the following detailed description of the invention taken in connection with the accompanying drawings, forming a part of this specification, and in which drawings:

Figures 1 to 5 inclusive are views of the novel vehicle while disposed upon a substantially flat surface.

Figure 3 is a vertical section, substantially upon the line 3—3 of Figure 2.

Figure 4 is a fragmentary horizontal section as taken below the body of the vehicle.

Figure 5 is a perspective view of substantially one-half the chassis showing, as in Figures 1 to 4, the positions of parts when the vehicle is disposed upon a substantially flat surface.

Figure 1:
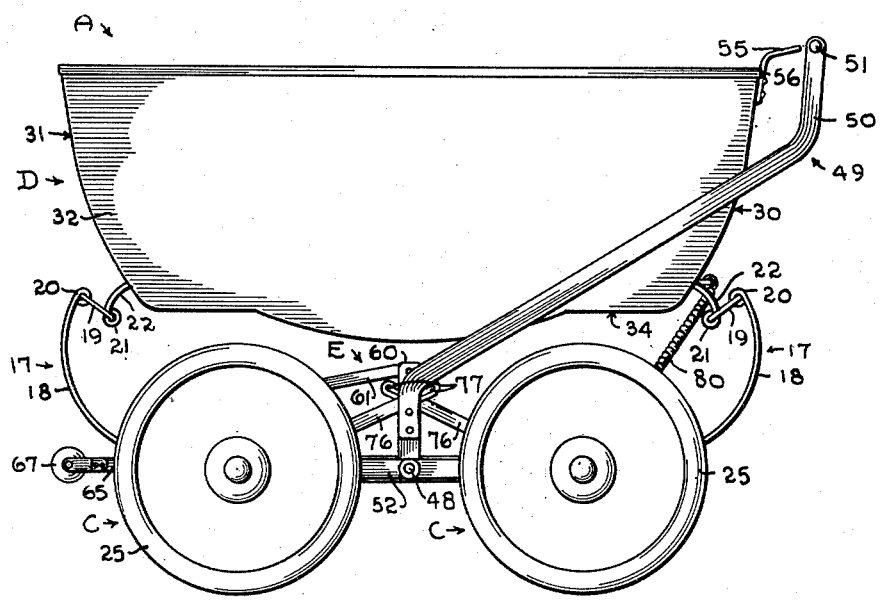
Figure 1 is a side elevation thereof.

Figures 6 to 8 inclusive are views of this vehicle, showing the relative positions of parts while the vehicle is ascending a curb or the like.

Figure 6 is a vertical section corresponding somewhat with the showing in Figure 3.

Figure 7 is a fragmentary horizontal section and corresponds somewhat with part of the showing in Figure 4.

Figure 8 is a perspective view of substantially one-half the chassis showing the positions of parts when the vehicle is ascending or stepping up a curb or the like.

Figures 9 to 11 inclusive are views illustrating the position of parts while the new vehicle is descending a curb or the like.

Figure 9 is a vertical section and corresponds somewhat with Figures 3 and 6.

Figure 10 is a fragmentary horizontal section, corresponding somewhat with Figure 7.

Figure 11 is a perspective view, akin to those of Figures 5 and 8, but illustrating the position of parts while descending a curb or like structure.

In the drawings, wherein for the purpose of illustration is shown a preferred embodiment of the invention and wherein similar reference characters designate corresponding parts throughout the several views, the new and novel vehicle is designated as A and includes a chassis B, mounted upon ground wheels C, a body D disposed upon the chassis B, and means E to effect relative movement between the chassis B, wheels C and body D. A curb F is shown for illustrative purposes.

The vehicle A is illustrated as a baby carriage, adapted to be hand steered.

As for the chassis B, the same includes longitudinally-extending, substantially parallel, rigid support members 15, fixedly secured, to transversely-extending, substantially parallel, rigid support members 16. Preferably, the members 15 and 16 are angle irons.

Carried by, preferably, the members 15 is means 17 to floatably mount the body D, which means may include two upwardly-extending leaf springs 18, each provided at its free end with a device to detachably couple the body D to the springs 18. Each of these devices may be a strap 19 with each of the straps 19 looped through an eye portion 20 at the free end of the adjacent spring, and then looped through an eye portion 21 carried by an arm 22 projecting from the body D, substantially as in Figure 1.

The ground wheels C are, preferably, of the same circumferences, may be provided with tires 25 and are freely rotatable on spindles 41, forming part of the means E to be subsequently described.

Any preferred arrangement of body D may be provided. In the example shown there is an elongated body comprising a rear wall 30, a wall 31 facing the wall 30 and walls 32 and 33 joining the walls 30 and 31, all extending upwardly from a floor 34 defining an upwardly-opening compartment.

As for the novel means E to effect relative movements between the chassis B, wheels C and body D, this includes a pair of axle members 40 each preferably comprising a round rod having at each of its free ends a spindle 41 rotatably supporting the wheels C. Inwardly of the spindles 41 the axle member includes portions 42 which extend normal to the spindles and then these members include portions 43 which project parallel with the spindles 41 and extend through openings in the support members 15, which members provide bearings for the axles 40 and, whereby, the spindles 41 and portions 42 are disposed outwardly of the members 15. In effect, the portions 41, 42 and 43 form cranks. The axle members 40 then extend across the chassis B but, intermediate their lengths, each is provided with a substantially U-shaped portion 44, the bight 45 thereof being adapted to cooperate with an oppositely-forked member or so-called Geneva bar 46 extending longitudinally of the chassis B and fixedly mounted upon opposite faces of a rocker rod or member 47, preferably having a square transverse cross section, intermediate its ends, with the rod rockably carried by the members 15 since its end portions 48 may be cylindrical and extend through and outwardly of round openings in the members 15.

Secured to each end portion 48 of the rod 47 is a lever member 49 which preferably comprises a pair of arms 50 extending upwardly and rearwardly, along the walls 32 and 33 of the body D and terminate, when in their normal positions, rearwardly of the rear wall 30 of the body and above the horizontal plane of the upper edge of this wall. Rigidly fixed to, and extending from, arm to arm is a handle bar 51. The position of the bar 51 preferably is such that a person, propelling the vehicle A, can grasp it easily, since it may be used both to guide the vehicle and its various positions, together with that of the arms 50, govern the motions of those portions of the means E which elevate and lower the wheels C and a pilot wheel 67 to be subsequently described.

The assembly heretofore described and included in the means E operates as follows: First, referring to Figure 5, it will be seen that the Geneva bar 46 substantially parallels the member 15 (that is, it is substantially horizontal), and the arms 50 extend upwardly and outwardly so that the handle bar 51 is above the horizontal plane of the rear wall 30 and rearwardly of the vertical plane thereof. The axes of the wheels C are now all the same distance from the vehicle supporting surface, and the U-shaped portions 44 of the axles are substantially horizontal as are, too, the crank portions of these axles. However, in Figure 6, which illustrates the ascending or step-up position of the vehicle A, the bar 46 has now rocked substantially to a position wherein its rearwardly-pointing end extends upwardly and its forwardly-pointing end extends downwardly. This has been effected by an upward push, by the operator of the vehicle, upon the handle bar 51, so that the latter will be above the horizontal plane of the rear wall 30.

Since the bar 46 has been rocked as last described, it has forced a change in positions of portions of the axle members 40. The U-shaped portion 44 of the rearward axle member 40 now extends upwardly and, consequently, the crank arm portions of this rear axle member 40 extend downwardly. On the other hand, the U-shaped portion 44 of the forward axle member 40 now extends downwardly and its crank arm portions, consequently, extend upwardly. As a result, the axes of rotation of the forward wheels, i. e., the axes of the spindles 41, are upwardly of those of the rear wheels C and the forward wheels C are in positions to engage the top of the curb.

However, when the lever 49 is actuated by a pull downwardly upon the handle bar 51, so that the latter takes the position as in Figure 9, where it is now below the horizontal plane of the rear wall 30 and still rearwardly of the vertical plane of that wall, the Geneva bar 46 is now rocked to a position just opposite to that last described, with its rearwardly-pointing end extending downwardly and its forwardly-pointing end extending upwardly. As a result there is a crank like movement to the forward axle member 40 opposite to that last described so that the forward wheels C are now lowered and their axes of rotation are below the axes of rotation of the rear wheels C. This is the descending or step-down position of the vehicle A. Further description of the operations of the wheels C and means E will be described later.

Pivotally carried by the end portions 48 of the rocker rod 47, preferably outwardly of the connection of the arms 50 thereto, are oppositely-forked members 52 with their free end or forked portions 53 adapted to slidably accommodate portions of the spindles 41 as may be seen in Figures 5, 8 and 11. For ease in assembly, each member 52 may be fixedly mounted, intermediate its length to a sleeve which is adapted to slide over the cylindrical extremities of the rod 47 and be rotatably supported thereon. These members 52 have dual functions. They rock, of course, in unison with the crank arm portions of the axles as the latter are rotated by the movements described, and brace the chassis B as well as minimize up-and-down vibratory motion of the body D, when the vehicle is being operated, as will be subsequently brought out.

Figure 2:
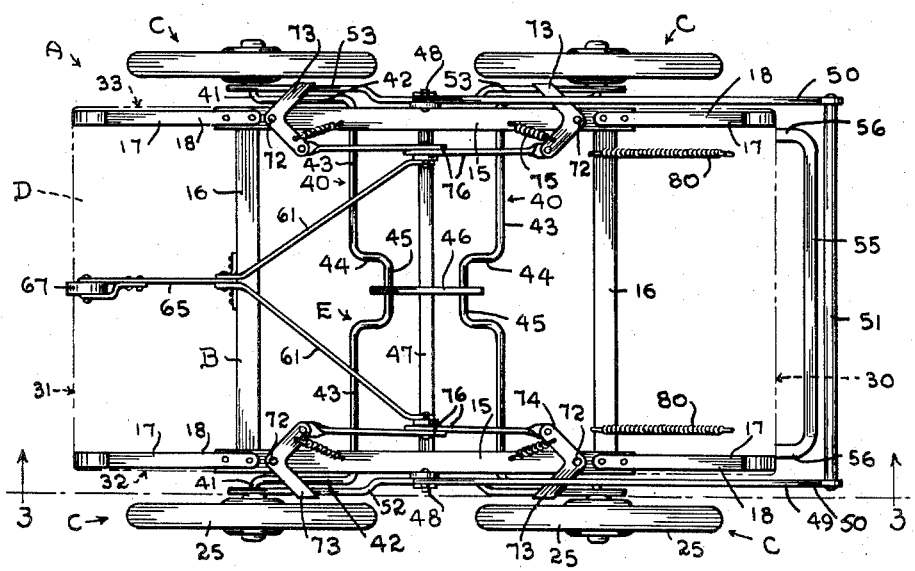
Figure 2 is a top plan thereof but with the body thereof shown only in dots and dashes, in order to better illustrate the mechanism below the body.

To assist in the manipulation of the lever member 49, there may be provided a fixed bar 55 shown in Figures 1 and 2, extending parallel with the handle bar 51, supported by brackets 56 attached to the body D, as to the rear wall 30, and inwardly of the lever member's arms 50. The fixed bar 55 is preferably disposed closely adjacent the handle bar 51 when the latter is in its first position mentioned. By holding both bars steady when in their relative positions as in Figure 1 (whereby the two bars form, in effect, but one handle) the means E is secured against operation, as will be more fully explained later, this being the method employed in wheeling the vehicle up or down a flight of steps, turning it about on its rear wheels, and the like.

With reference to the pilot wheel mentioned for assisting in causing the vehicle A to mount a curb or the like, it will be noted, as in Figures 4 and 5 that the rocker rod 47 fixedly supports a pair of standards 60, disposed beneath the body D. Extending from preferably adjacent the upper ends of these standards 60 are a pair of forwardly-converging arms 61 pivotally secured to the standards 60 and pivotally secured, at their joined-together forward ends 62, to the upper end of a downwardly-extending L-shaped lever 63 pivoted, at the juncture of its arms 64 and 65, to a bracket 66 carried by the forward member 16 of the chassis B. At the free forward end of the arm 65 of the lever 63 is rotatably carried a pilot wheel 67. When the vehicle A is positioned as in Figures 1 to 5 inclusive, this arm 65 of the lever 63 extends substantially horizontally at the time the vehicle A is positioned as in Figures 9 to 11 inclusive, the arm 65 points somewhat upwardly and when the vehicle A is disposed as in Figures 6 to 8 inclusive, it extends somewhat downwardly. The function of the pilot wheel 67, is, of course, to aid in mounting a curb since, when the handle bar is manipulated as in Figures 6 and 8, the pilot wheel 67 moves downwardly to engage the curb and, since it cannot then move further downwardly, it and its associated structure provide a leverage to readily raise the chassis B substantially one-half the height of the curb, and permit the forward wheels C to ascend the full height of the curb, as the rear wheels C exert a pressure upon the supporting surface and contribute to raising the chassis B. Thus there is a three-point support (rear wheels and pilot wheel) of the vehicle A during a period comparable with the period a conventional baby carriage, for instance, is being bodily lifted to raise the rear wheels level with the curb, during which time there is but two-point support (the front wheels). This three-point support provides for a steadier and easier raising of the vehicle to the curb.

Associated with the axle members 40 are, preferably, four devices or stop members 70 to selectively prevent or permit movements of the axles. Each of these includes a somewhat L-shaped bar 71, which may be pivoted to the upper faces of the chassis support members 15, with the axis of each pivot 72 normal to the axis of rotation of the nearest wheel C, when the axes are in the positions shown in Figure 1. One portion 73 of each bar 71 normally extends outwardly of the member to which it is pivoted and over both the axle portion and adjacent free end portion 53 of the member 52. To the other portion 74 of each bar 71 is attached one end of a retraction coil spring 75 while the other end is attached to the adjacent support member 15, and near the axle 40 at the portion thereof which extends across the chassis, as may be seen in Figures 4, 7 and 10, for example.

Pivoted to adjacent the free end of each of the portions 74 is one end of a bar 76 so that two bars 76 converge upwardly and overlap at their upper ends at the nearest standard 60 (one end of one bar 76 slidable over one face of the adjacent standard and the other end of the other bar 76 slidable over the outer face of the first-named bar.) Each bar 76 is provided with a slot 77 at its standard-engaging end through which slot extends a double-headed pin 78 secured to the standard intermediate its length.

Normally (when the axes of rotation of all the wheels C are disposed substantially the same distance from the supporting surface for the wheels, and the chassis is substantially level), the walls of the slots 77 at the inner ends of the slots 77 engage the peripheries of the pins 78.

The construction just described is provided for several purposes. In the first place, the normally-disposed portions 73 of the L-shaped bars 71, as in Figures 1 to 5, prevent rotation of the axles, since the crank arm portions thereof cannot rotate upwardly (being prevented by these portions 73). However, when the vehicle A takes the position shown in Figures 6 to 8, the two portions 73 of the two forward L-shaped bars 71 move from directly over the crank arm portions of the forward axle, and permit rotation of the same, so that the two forward wheels C may move upwardly, but the two rearward L-shaped bars 71 still extend above the rearward axle. As may be seen in Figures 9 to 11, the two portions 73 of the two rearward L-shaped bars 71 have moved from directly over the crank arm portions of the rearward axle, and thus this axle may rotate to raise the rearward wheels C, but the two forward L-shaped bars 71 still extend over the path of travel of the forward axle. The pin 78 in cooperation with the walls of the slots 77 permit but one set or the other set of bars 71 to move out of the path of travel of the crank portions at any time.

When the handle 49 is pushed from its position as in Figure 1 to that in Figure 6, it turns the Geneva bar 46 into which is inserted the U-shaped portion 44 of the axle. Bight 45 starts to turn slowly and as the distance of the latter from the center of the Geneva bar increases, the speed of the bight 45, in turning, is accelerated. Therefore, when the Geneva bar turns axle 43 (Figure 8) at the U-shaped portion, the wheel crank 42 starts to turn slowly and increases its speed as the bight 45 moves further from the center of the Geneva bar. Again when handle 49 is pushed forward it, in turn, through standards 60 and connecting bar 76, pushes latches 71. These latches move as fast as the handle is moved forwardly. Since the latches move instantly and the crank 42 is slightly delayed, the latches are almost out of the way before the crank 42 moves up to meet them. When axle 42 describes its movement, the distance between the spindle 41 on which the wheel is mounted to the frame 15 (Figure 8) is considerable. However, the vertical distance between crank 42 and frame 15 decreases toward the vertex of the angle formed. Since latch 71 turns in the direction of the vertex it has ample time to clear the crank axle 42.

The springs 75, disposed as they are, aid in easier manipulations of the lever member 49 by the operator and normally tend to cause (in cooperation with the bars 76, pins 78, and standards 60) the body D to assume a level position as well as bring the lever member 49 back to the normal position of Figure 1. It is also apparent that they function to restore the stop members 70 to their normal positions as in Figure 2.

It has been found desirable to provide a pair of retraction coil springs 80 at the rear part of the vehicle, each secured at its upper end to the body D and at its lower end to the rearmost support member 16. These springs function to stabilize the body, preventing canting of the body as well as any jar, as the moment the vehicle A completes its ascent of a curb.

When the operator desires to cause the vehicle to descend a curb or the like, he allows the front wheels C to hug the vertical wall of the curb F as they descend and, as may be seen by comparing Figure 3 and Figure 9, the chassis B and body D have descended toward the supporting surface for the vehicle. This descent is very gradual, and occurs as the weight of the vehicle causes the forward wheels to descend the curb F urged by operation of the handle bar 51 from its position in Figure 3 to that in Figure 9. Continued manipulation of this handle bar 51 causes the rear wheels to leave the curb whereupon the handle bar 51 assumes its normal position and the relative positions of parts are as in Figure 3. At no time during descent, has the body D been canted.

The cooperation of the pilot wheel 67 with the rest of the means E in ascending a curb or the like has been described. The operator allows the forward wheels C of the vehicle to contact the curb F, then moves the handle bar 51 from its position in Figure 3 to that in Figure 6 whereupon the pilot wheel encounters the top of the curb F and the front wheels C ascend as in Figure 6. The three point support now comes into play and the downward pressure upon the rear wheels C maintains the body D in a horizontal position without jars and vibrations. Forward movement of the vehicle and manipulation of the handle bar 51 raises the rear wheels to the level of the supporting surface of the front wheels and the entire carriage rolls upon this surface.

By referring to Figures 6 and 9, it will be seen that the ascent or descent of the body D was, in each case, substantially one-half the height of the curb F in one step of the ascent or descent.

Various changes may be made to the form of the invention herein shown and described without departing from the spirit of the invention or scope of the claims.

What is claimed is:

1. In a baby carriage, a chassis, two pairs of ground wheels, means carried by said chassis for moving the axes of rotation of the wheels of a first pair upwardly as the axes of rotation of the wheels of the other pair move downwardly, including a pair of crank portions for said first pair, rotatably carried by said chassis, each of said crank portions including a spindle with one wheel of said first pair, rotatably mounted on one of said spindles and the other wheel of said first pair rotatably mounted on the other of said spindles, and means to selectively permit and restrain the rotation of one of said crank portions, including a pivoted member movable into and out of the path of travel of said one of said crank portions.

2. In a vehicle, a chassis, two pairs of ground wheels, and means carried by said chassis for moving the axes of rotation of the wheels of a first pair upwardly as the axes of rotation of the wheels of the other pair move downwardly, including an axle member supported by and extending across said chassis, having a pair of crank portions for said first pair of wheels each of said crank portions including a spindle with one wheel of said first pair rotatably mounted on one of said spindles and the other wheel of said pair rotatably mounted upon the other of said spindles, said axle member intermediate its ends, having a substantially U-shaped portion, a rocker rod member, rockably mounted on and extending across said chassis, a rigid member mounted upon said rod, having a slot accommodating the bight portion of said axle, and a lever operatively connected with said rod.

3. In a baby carriage, a chassis, a body mounted thereon, two pairs of ground wheels, means rotatably supporting said ground wheels so that the axes of rotation of one pair may be moved upwardly as the axis of rotation of the other pair moves downwardly, including a pair of spaced-apart axle members supported by and extending across said chassis, each member having a pair of crank portions including a wheel-accommodating spindle, with one of said ground wheels rotatably carried thereon, the spindles of one axle being normally disposed so that they are spaced from the spindles of the other axle the greatest possible distance apart and with the axis of each spindle disposed substantially a like distance from the support surface of said wheels, said axle members, intermediate their lengths, each being provided with a substantially U-shaped portion with said portions normally disposed horizontal and facing toward each other, a rocker member, rockably mounted upon said chassis and extending across said chassis adjacent said U-shaped portions, said rocker member having a slotted member rigidly mounted thereon said slotted member having a pair of slots at opposite ends thereof and with the bight sections of said U-shaped portions within said slots, and a lever rigidly connected with said rocker member.

4. In a baby carriage, a chassis, a body mounted thereon, two pairs of ground wheels, means rotatably supporting said ground wheels so that the axes of rotation of one pair may be moved upwardly as the axes of rotation of the other pair moves downwardly, including a pair of spaced-apart axle members supported by and extending across said chassis, each member having a pair of crank portions including a wheel-accommodating spindle, with one of said ground wheels rotatably carried thereon, the spindles of one axle being normally disposed so that they are spaced from the spindles of the other axle the greatest possible distance apart and with the axis of each spindle disposed substantially a like distance from the support surface of said wheels, said axle members, intermediate their lengths, each being provided with a substantially U-shaped portion with said portions normally disposed horizontal and facing toward each other, a rocker member, rockably mounted upon said chassis and extending across said chassis adjacent said U-shaped portions, said rocker member having a slotted member rigidly mounted thereon, said slotted member having a pair of slots at opposite ends thereof and with the bight sections of said U-shaped portions within said slots, a lever rigidly connected with said rocker member, and means to selectively limit rotation of one of said axle members in one direction and to permit rotation of the other axle member, including stops, pivoted to said chassis, and movable into and out of the paths of travel of said axle members.

5. In a baby carriage, a chassis, a body mounted thereon, two pairs of ground wheels, means rotatably supporting said ground wheels so that the axes of rotation of one pair may be moved upwardly as the axes of rotation of the other pair moves downwardly, including a pair of spaced-apart axle members supported by and extending across said chassis, each member having a pair of crank portions including a wheel-accommodating spindle, with one of said ground wheels rotatably carried thereon, the spindles of one axle being normally disposed so that they are spaced from the spindles of the other axle the greatest possible distance apart and with the axes of each spindle disposed substantially a like distance from the support surface of said wheels, said axle members, intermediate their lengths, each being provided with a substantially U-shaped portion with said portions normally disposed horizontal and facing toward each other, a rocker member, rockably mounted upon said chassis and extending across said chassis adjacent said U-shaped portions, said rocker member having a slotted member rigidly mounted thereon, said slotted member having a pair of slots at opposite ends thereof and with the bight sections of said U-shaped portions within said slots, a lever rigidly connected with said rocker member, and means to selectively limit rotation of one of said axle members in one direction and to permit rotation of the other axle member, including stops, pivoted to said chassis, and movable into and out of the paths of travel of said axle members, and operatively connected with said lever.

6. In a baby carriage, a chassis, two pairs of ground wheels, a pilot wheel, disposed forwardly of said chassis, and means carried by said chassis for moving the axes of rotation of the wheels of a first pair upwardly as the axes of rotation of the wheels of the other pair move downwardly, including a pair of crank portions for said first pair, rotatably carried by said chassis, each of said crank portions including a spindle with one wheel of said first pair rotatably mounted on one of said spindles and the other wheel of said first pair rotatably mounted on the other of said spindles, a rocker bar assembly, including a rocker bar extending across said chassis, constructed and arranged to rock said crank portions, and means to move the axis of rotation of said pilot wheel upwardly and downwardly, simultaneously with the movement of the axis of rotation of said first pair of wheels, including an operative pivoted connection between said rocker bar assembly and said pivot wheel.

7. In a baby carriage, a chassis, two pairs of ground wheels, a pilot wheel, disposed forwardly of said chassis, and means carried by said chassis for moving the axis of rotation of the wheels of a first pair upwardly as the axes of rotation of the wheels of the other pair move downwardly, including a pair of crank portions for said first pair, rotatably carried by said chassis, each of said crank portions including a spindle with one wheel of said first pair rotatably mounted on one of said spindles and the other wheel of said first pair rotatably mounted on the other of said spindles, a rocker bar assembly, including a rocker bar extending across said chassis, constructed and arranged to rock said crank portions, and means to move the axis of rotation of said pilot wheel upwardly and downwardly, simultaneously with the movement of the axes of rotation of said first pair of wheels, including an upright rigidly carried by said rocker bar, a rigid arm extending therefrom toward the front of said vehicle, a substantially L-shaped arm pivoted to said rigid arm at one end of said L-shaped arm, a pivotal connection between the intermediate portion of said L-shaped arm and said chassis, said pilot wheel being pivotally carried by the other end of said L-shaped arm.

8. In a vehicle, a chassis, two pairs of ground wheels, and means carried by said chassis for moving the axes of rotation of the wheels of a first pair upwardly as the axes of rotation of the wheels of the other pair move downwardly, including an axle member supported by and extending across said chassis, having a pair of crank portions for said first pair of wheels each of said crank portions including a spindle with one wheel of said first pair rotatably mounted on one of said spindles and the other wheel of said pair rotatably mounted upon the other of said spindles, said axle member intermediate its ends, having a substantially U-shaped portion, a rocker rod member, rockably mounted on and extending across said chassis, a rigid member mounted upon said rod, having a slot accommodating the bight portion of said axle, a lever operatively connected with said rod, and means to brace said chassis, including a pair of oppositely-forked members, pivotally carried by said rod adjacent said crank portions, with the forked portions of said oppositely-forked members slidably accommodating parts of the crank portions of said axles.

9. In a baby carriage, a chassis, a body mounted thereon, two pairs of ground wheels, means rotatably supporting said ground wheels so that the axes of rotation of one pair may be moved upwardly as the axes of rotation of the other pair moves downwardly, including a pair of spaced-apart axle members supported by and extending across said chassis, each member having a pair of crank portions including a wheel-accommodating spindle, with one of said ground wheels rotatably carried thereon, the spindles of one axle being normally disposed so that they are spaced from the spindles of the other axle the greatest possible distance apart and with the axes of each spindle disposed substantially a like distance from the support surface of said wheels, said axle members, intermediate their lengths, each being provided with a substantially U-shaped portion with said portions normally disposed horizontal and facing toward each other, a rocker member, rockably mounted upon said chassis and extending across said chassis adjacent said U-shaped portions, said rocker member having a slotted member rigidly mounted thereon, said slotted member having a pair of slots at opposite ends thereof and with the bight sections of said U-shaped portions within said slots, a lever rigidly connected with said rocker member, and means to selectively limit rotation of one of said axle members in one direction and to permit rotation of the other axle member, including stops, pivoted to said chassis, and movable into and out of the paths of travel of said axle members, and operatively connected with said lever, a pair of standards fixedly secured to and extending upward from said rocker member, each standard having a pin adjacent its upper end, and a pair of bars for each standard, each bar having a slot at one of its ends, with one of said pins accommodated in the slots of a pair of said slotted bars, each of said slotted bars being pivotally connected, at their ends opposite their slotted ends, with said stops.

10. In a baby carriage, a chassis, an elongated body supported by said chassis, two pairs of ground wheels, means for moving the axis of rotation of one of said pairs upwardly as the axis of rotation of the other pair moves downwardly, including spindles for said wheels, a lever member extending upwardly from said chassis and rearwardly of said body, a handle bar rigidly connected with the free end of said lever member and extending substantially parallel with the transverse axis of said body, and a bar extending substantially parallel with the handle bar, within grasping distance thereof by the hand of the operator of the vehicle, at all times during movement of said handle bar, by the other hand of the operator, and secured to said body.

11. In a vehicle, a chassis, two pairs of ground wheels, and means carried by said chassis for moving the axes of rotation of the wheels of a first pair upwardly as the axes of rotation of the wheels of the other pair move downwardly, including two spaced-apart axle members rotatably supported by and extending across said chassis, each axle member having a pair of spaced-apart crank portions with each crank portion terminating in a spindle mounting a ground wheel, and each axle member including a substantially U-shaped portion intermediate its length, a rocker rod member rockably mounted upon and extending across said chassis between and spaced from said axle members, said rocker rod member having an elongated member fixed thereto, at the intermediate portions of said rocker rod member and elongated member, and said elongated member having a slot extending inwardly from each of its ends, with the bights of said U-shaped portions within said slots, and a lever operatively connected with said rod member.

12. In a vehicle according to claim 11 which also includes means to selectively permit and restrain rotation of one of said crank portions in one direction, including a member operatively connected with said lever and movable into and out of the path of travel of said one of said crank portions during movement of said lever in one direction.

13. In a vehicle according to claim 11 which also includes means to selectively permit and restrain rotation of one of said crank portions in one direction, including a member operatively connected with said lever and movable into and out of the path of travel of said one of said crank portions during movement of said lever in one direction, said last-named member comprising a substantially L-shaped bar, pivotally carried by said chassis.

HENRY MARGILOFF.

REFERENCES CITED

The following references are of record in the file of this patent:

UNITED STATES PATENTS

| Number | Name | Date |
|---|---|---|
| 1,785,646 | Pascoo | Dec. 16, 1930 |
| 1,890,469 | Powers | Dec. 13, 1932 |
| 1,980,211 | Kroll et al. | Nov. 13, 1934 |
| 2,390,671 | Tannenbaum | Dec. 11, 1945 |
| 2,418,665 | Rizzuto | Apr. 8, 1947 |

FOREIGN PATENTS

| Number | Country | Date |
|---|---|---|
| 714,959 | France | Sept. 14, 1931 |